US012586700B2

(12) United States Patent
Lee et al.

(10) Patent No.: US 12,586,700 B2
(45) Date of Patent: Mar. 24, 2026

(54) METHOD FOR MANUFACTURING ANISOTROPIC RARE EARTH BULK MAGNET, AND ANISOTROPIC RARE EARTH BULK MAGNET MANUFACTURED THEREBY

(71) Applicant: KOREA INSTITUTE OF MATERIALS SCIENCE, Changwon-si (KR)

(72) Inventors: Jung Goo Lee, Changwon-si (KR); Hee Ryoung Cha, Gimhae-si (KR); Ga Yeong Kim, Busan (KR); Tae Hoon Kim, Changwon-si (KR); Young Kuk Kim, Changwon-si (KR); Youn Kyoung Baek, Changwon-si (KR)

(73) Assignee: KOREA INSTITUTE OF MATERIALS SCIENCE, Changwon-si (KR)

( * ) Notice: Subject to any disclaimer, the term of this patent is extended or adjusted under 35 U.S.C. 154(b) by 657 days.

(21) Appl. No.: 18/007,664

(22) PCT Filed: Nov. 9, 2021

(86) PCT No.: PCT/KR2021/016241
§ 371 (c)(1),
(2) Date: Dec. 1, 2022

(87) PCT Pub. No.: WO2022/169073
PCT Pub. Date: Aug. 11, 2022

(65) Prior Publication Data

US 2023/0282399 A1 Sep. 7, 2023

(30) Foreign Application Priority Data

Feb. 8, 2021 (KR) ........................ 10-2021-0017804

(51) Int. Cl.
*H01F 1/153* (2006.01)

(52) U.S. Cl.
CPC ..... *H01F 1/15325* (2013.01); *H01F 1/15341* (2013.01)

(58) Field of Classification Search
CPC .................................................. H01F 1/15325
See application file for complete search history.

(56) References Cited

U.S. PATENT DOCUMENTS

2012/0001711 A1* 1/2012 McCallum ................ H01F 7/02 420/83
2017/0103837 A1 4/2017 Sun et al.

FOREIGN PATENT DOCUMENTS

EP 3522178 A1 * 8/2019 ............ H01F 41/02
EP 3625807 B1 * 3/2021 ........... H01F 1/0576
(Continued)

OTHER PUBLICATIONS

Korean Office Action issued on Mar. 30, 2023, in connection with the Korean Patent Application No. 10-2021-0153273, 11 pages, citing the above reference(s).
(Continued)

*Primary Examiner* — Peter F Godenschwager
(74) *Attorney, Agent, or Firm* — Hauptman Ham, LLP

(57) ABSTRACT

Proposed are a method of manufacturing an anisotropic rare-earth bulk magnet, the method being capable of suppressing formation of $ReFe_2$ phase, and an anisotropic rare-earth bulk magnet having excellent magnetic properties.

14 Claims, 11 Drawing Sheets

(56) References Cited

FOREIGN PATENT DOCUMENTS

| | | | |
|---|---|---|---|
| KR | 10-2015-0033528 | A | 4/2015 |
| KR | 10-2019-0080748 | A | 7/2019 |
| KR | 10-2020-0144853 | A | 12/2020 |
| WO | 2012/036294 | A1 | 3/2012 |

OTHER PUBLICATIONS

International Search Report mailed on Mar. 2, 2022, in connection with International Patent Application No. PCT/KR2021/016241, along with English translation, 6 pages.

Written Opinion mailed on Mar. 2, 2022, in connection with International Patent Application No. PCT/KR2021/016241, 5 pages.

* cited by examiner

METHOD FOR MANUFACTURING ANISOTROPIC RARE EARTH BULK MAGNET, AND ANISOTROPIC RARE EARTH BULK MAGNET MANUFACTURED THEREBY

CROSS-REFERENCE TO RELATED APPLICATION

The present application is a national stage filing under 35 U.S.C § 371 of PCT application number PCT/KR2021/016241 filed on Nov. 9, 2021 which is based upon and claims the benefit of priority to Korean Patent Application No. 10-2021-0017804, filed on Feb. 8, 2021, in the Korean Intellectual Property Office, which are incorporated herein by reference in their entireties.

TECHNICAL FIELD

The present application claims priority to Korean Patent Application No. 10-2021-0017804, filed Feb. 8, 2021, the entire contents of which are incorporated herein for all purposes by this reference.

The present disclosure relates to a method of manufacturing an anisotropic rare-earth bulk magnet and an anisotropic rare-earth bulk magnet manufactured using the method. Particularly, the present disclosure relates to a method of manufacturing an anisotropic rare-earth bulk magnet having excellent magnetic properties and an anisotropic rare-earth bulk magnet manufactured using the method.

BACKGROUND ART

In recent years, with active research and development of various machines and apparatuses, there has been an explosive increase in demand for magnets used as components thereof. Particularly, a trend is a gradual increase in demand for Nd—Fe—B magnets due to their excellent magnetic properties.

However, Nd is a rare-earth metal. The Earth does have small deposits of Nd beneath its surface. The world price of Nd is very high, thereby increasing the prices of the magnets. In addition, it is expected that Nd is also gradually more difficult to supply in the future due to an increase in demand for Nd magnets. FIG. 1 is a graph showing manufacturing output and prices of rare-earth elements in China. From FIG. 1, it can be seen that, because the amount of Nd production is relatively small, the price of Nd is high.

In order to solve this problem, an attempt has been increasingly made to add other rare-earth metals, such as La and Ce, instead of Nd. Because larger amounts of these rare-earth metals are produced, the prices thereof are inexpensive. However, in the current situation, in a case where other metals other than Nd is added, because magnetic properties of magnets made therefrom are so inferior that it is difficult to replace Nd—Fe—B magnets.

Particularly, in a case where anisotropic magnets are manufactured by adding Ce instead of Nd, $ReFe_2$ phase is generated as the second phase. Because generated $ReFe_2$ phase has a Curie Temperature of 235K and has a paramagnetism property at room temperature, magnetic properties are decreased, and $ReFe_2$ phase is generated. Accordingly, fractions of Nd-rich phase and $Re_2Fe_{14}B$ main phase of a grain boundary are reduced, and $ReFe_2$ phase has a high melting point of 1198K and thus is also present as a solid phase during a hot-deforming process. Accordingly, crystal grains are prevented from being aligned with a magnetization facilitating axis during the corresponding process, and the degree of orientation of the crystal grains is decreased. Consequently, there occurs a problem in that a remanent magnetization scale of a finally formed magnet is decreased.

Therefore, in order to manufacture an anisotropic rare-earth bulk magnet having high magnetic properties, there is a need to suppress generation of $ReFe_2$ phase.

DISCLOSURE

Technical Problem

An object of the present disclosure is to provide a method of manufacturing an anisotropic rare-earth bulk magnet, the method suppressing formation of $ReFe_2$ phase, and an anisotropic rare-earth bulk magnet having excellent magnetic properties.

However, the present disclosure is not limited to the above-mentioned object, and, from the following description, an object not mentioned would be definitely understandable to a person of ordinary skill in the art.

Technical Solution

According to an aspect of the present disclosure, there is provided a method of manufacturing an anisotropic rare-earth bulk magnet, the method comprising steps of: preparing amorphous magnetic powders, each containing Re—Fe—B; manufacturing an isotropic bulk magnet by press-sintering the amorphous magnetic powders; and manufacturing an anisotropic bulk magnet by hot-deforming the isotropic bulk magnet, wherein the Re contains Nd and Ce, and the anisotropic bulk magnet contains a weight fraction of $ReFe_2$ phase that satisfies $$P \leq A*X-3 \qquad \text{[Equation 1]}$$

where P is a weight fraction (wt %) of $ReFe_2$ phase with respect to the entire anisotropic bulk magnet, X is a fraction of the number of moles of Ce with respect to the total number of moles of the Re, and A is 13 to 15.

According to another aspect of the present disclosure, there is provided an anisotropic rare-earth bulk magnet manufactured with the method, wherein a crystal grain has an average short-axis length of 20 nm to 300 nm and an average long-axis length of 100 nm to 1000 nm.

Advantageous Effects

With a method of manufacturing an anisotropic rare-earth bulk magnet according to a first embodiment, an anisotropic rare-earth bulk magnet that rarely contains $ReFe_2$ phase and thus has excellent magnetic properties can be provided.

With the method of manufacturing an anisotropic rare-earth bulk magnet according to the first embodiment of the present disclose, the anisotropic rare-earth bulk magnet that has small-sized crystal grains and thus has excellent magnetic properties can be provided.

An anisotropic rare-earth bulk magnet according to a second embodiment of the present disclosure rarely contains $ReFe_2$ phase and thus can have excellent magnetic properties, such as a remanent magnetization scale and a maximum magnetic energy product.

The present disclosure is not limited to the above-mentioned effects. From the present specification and the accompanying drawings, an effect not mentioned above would be definitely understandable to a person of ordinary skill in the art.

MODE FOR INVENTION

Figure 1:
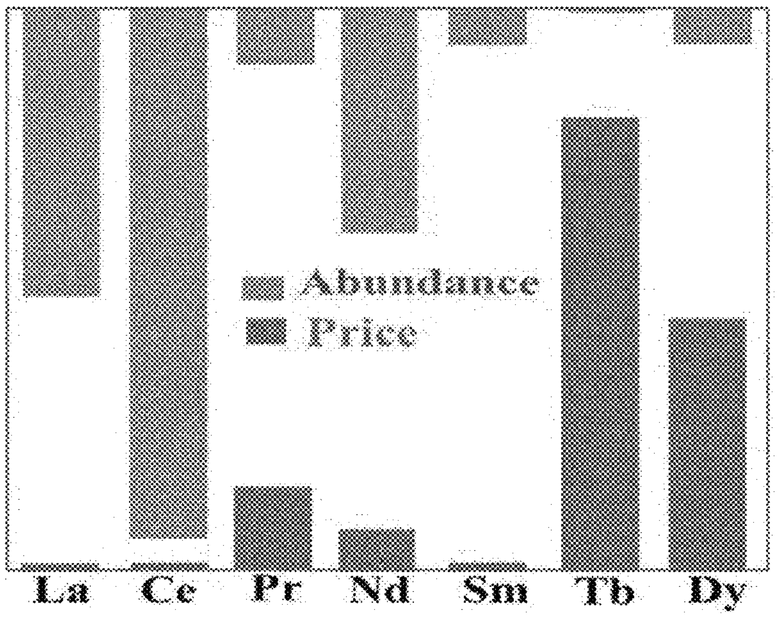
FIG. 1 is a graph showing manufacturing output and prices of rare-earth elements in China.

In the specification of the present application, unless explicitly specified otherwise, the expression “includes or comprises a certain constituent element” means “may further include or comprise any other constituent element, not “excludes any other constituent element.”

Throughout the specification of the present application, the unit “parts by weight” may mean proportions by weight of components.

Throughout the specification of the present application, “A and/or B” means “A and B, or A or B.”

The present disclosure will be described in more detail below.

A method of manufacturing an anisotropic rare-earth bulk magnet according to a first embodiment of the present disclosure includes: a step of preparing amorphous magnetic powders, each containing Re—Fe—B; a step of manufacturing an isotropic bulk magnet by press-sintering the amorphous magnetic powders; and a step of manufacturing an anisotropic bulk magnet by hot-deforming the isotropic bulk magnet, wherein the Re contains Nd and Ce, and the anisotropic bulk magnet contains a weight fraction of $ReFe_2$ phase that satisfies following Equation 1.

$$P \leq A*X-3$$

where, P is a weight fraction (wt %) of the $ReFe_2$ phase with respect to the entire anisotropic bulk magnet, X is a fraction of the number of moles of Ce with respect to the total number of moles of the Re, and A is 13 to 15.

With the method of manufacturing an anisotropic rare-earth bulk magnet according to the first embodiment of the present disclosure, an anisotropic rare-earth bulk magnet may be provided that rarely contains $ReFe_2$ phase, has small-sized crystal grain, and thus has excellent magnetic properties.

Steps of the method will be described in detail below.

According to the first embodiment of the present disclosure, the amorphous magnetic powders, each containing Re—Fe—B are first prepared. The amorphous magnetic powders may be manufactured with various manufacturing methods known in the art, and the manufactured amorphous magnetic powders may be prepared. For example, the amorphous magnetic powders may be manufactured with a method of quenching an alloy ingot containing the Re—Fe—B and thus manufacturing amorphous powders. Specifically, the amorphous magnetic powders may be manufactured using methods, such as melt spinning, gas spraying, water spraying, and high energy mill. owever, the amorphous magnetic powders are not limited to these methods.

According to the first embodiment of the present disclosure, the step of preparing the amorphous magnetic powders may include: a step of preparing an ingot containing Re—Fe—B; a step of manufacturing a ribbon by melt-spinning the ingot; and a step of manufacturing powders by pulverizing the ribbon.

The ingot containing the Re—Fe—B may be manufactured by melting and mixing bulk metals that are ingredients of the ingot, and the manufactured ingot may be prepared. That is, the ingot may be manufactured by melting and mixing Nd, Ce, Fe, and B. In this process, any other rare-earth metal and/or non-rare-earth metal may be added, and, according to the purpose of a magnet to be manufactured and the need therefor, any other Nd, Ce, Fe, and B contents, and any other rare-earth metal content and/or any other non-rare-earth metal content may be adjusted.

Specifically, the Re may contain Nd and Ce and, according to the purpose of a magnet to be manufactured and the need therefor, may further contain one or more elements selected from the group consisting of Sc, Y, La, Pr, Pm, Sm, Eu, Gd, Tb, Dy, Ho, Er, Tm, Yb, and Lu. In addition, in addition to the elements listed above, according to purpose, the Re may further contain a non-rare-earth metal. For example, the non-rare-earth metal may contain a metal element, such as Ga, Co, Al, Cu, Nb, Ti, Si, Zr, Ta, V, Mo, Mn, Zn, Ni, Cr, Pb, Sn, In, Mg, Ag, or Ge, and may contain approximately 10 at % or less of this metal element.

According to the first embodiment of the present disclosure, the ingot may have a composition of $Nd_aR_bFe_{100-a-b-c-d}M_cB_d$, where R may contain one or more of Sc, Y, La, Ce, Pr, Pm, Sm, Eu, Gd, Tb, Dy, Ho, Er, Tm, Yb, and Lu, M may contain one or more of Ga, Co, Al, Cu, Nb, Ti, Si, Zr, Ta, V, Mo, Mn, Zn, Ni, Cr, Pb, Sn, In, Mg, Ag, and Ge, a may be equal to or greater than 0 and equal to or smaller than 20, b may be equal to or greater than 0 and equal to or smaller than 20, c may be equal to or greater than 0 and equal to or smaller than 15, d may be equal to or greater than 0 and equal to or smaller than 15, and a, b, c, and d may be in unit of atom %.

According to the first embodiment of the present disclosure, for example, the ingot may have a composition of $(Nd_{1-x}Ce_x)_{13.6}Fe_{bal.}B_{5.6}M_{7.2}$. In the composition formula, x may be 0.1 to 0.9, 0.1 to 0.7, 0.1 to 0.5, 0.2 to 0.4, 0.2 to 0.5, 0.2 to 0.3, or 0.3 to 0.4, bal. may mean a balance as a content that, when added to any other component as a content, is 100, M may be a non-rare-earth metal containing one or more of Ga, Co, Al, Cu, Nb, Ti, Si, Zr, Ta, V, Mo, Mn, Zn, Ni, Cr, Pb, Sn, In, Mg, Ag, and Ge, as listed above, and characters shown as a subscript may be in unit of atom %. In a case where the ingot has the above-mentioned composition, a magnet manufactured using the manufactured amorphous magnetic powders may have excellent magnetic properties.

According to the first embodiment of the present disclosure, the ribbon may be manufactured by melt-spinning the ingot at a wheel speed of 25 m/s to 50 m/s, 35 m/s to 50 m/s, or 35 m/s to 40 m/s. The wheel speed may be adjusted according to the composition for the ingot. For example, in a case where a Ce content increases, the melt-spinning may be performed at a higher wheel speed. In a case where the ingot is manufactured by performing the melt-spinning at the wheel speeds within the above-mentioned ranges, an amorphous ribbon may be manufactured, and powders having a high amorphousness level may be provided by pulverizing the amorphous ribbon.

Next, the powders may be manufactured by pulverizing the ribbon. The pulverizing may be performed with a method used in the art.

According to the first embodiment of the present disclosure, the amorphous magnetic powders each have an average diameter of 50 μm or greater, 100 μm or greater, or 200 μm or greater, but are not limited to this diameter range. However, in a case where the diameters of the powders are too small, as a surface area thereof increases, oxidation can easily occur. Therefore, it is preferable to use the amorphous magnetic powders, each having a diameter within the above-mentioned diameter range.

According to the first embodiment of the present disclosure, amorphous magnetic powders each have a composition of $Nd_aR_bFe_{100-a-b-c-d}M_cB_d$, where R may contain one or more of Sc, Y, La, Ce, Pr, Pm, Sm, Eu, Gd, Tb, Dy, Ho, Er, Tm, Yb, and Lu, M may contain one or more of Ga, Co, Al, Cu, Nb, Ti, Si, Zr, Ta, V, Mo, Mn, Zn, Ni, Cr, Pb, Sn, In, Mg, Ag, and Ge, a may be equal to or greater than 0 and equal to or smaller than 20, b may be equal to or greater than 0 and equal to or smaller than 20, c may be equal to or greater than 0 and equal to or smaller than 15, d may be equal to or greater than 0 and equal to or smaller than 15, and a, b, c, and d may be in unit of atom %. The amorphous magnetic powders derived from the ingot may have the same composition as the ingot.

According to the first embodiment of the present disclosure, the amorphous magnetic powders may each have a composition of, for example, $(Nd_{1-x}Ce_x)_{13.6}Fe_{bal.}B_{5.6}M_{7.2}$. In the composition formula, x may be 0.1 to 0.9, 0.1 to 0.7, 0.1 to 0.5, 0.2 to 0.4, 0.2 to 0.5, 0.2 to 0.3, or 0.3 to 0.4, bal. may mean a balance as a content that, when added to any other component as a content, is 100, M may be a non-rare-earth metal containing one or more of Ga, Co, Al, Cu, Nb, Ti, Si, Zr, Ta, V, Mo, Mn, Zn, Ni, Cr, Pb, Sn, In, Mg, Ag, and Ge, as listed above, and characters shown as a subscript may be in unit of atom %. The amorphous magnetic powders derived from the ingot may each have the same composition as the ingot.

Next, the isotropic bulk magnet is manufactured by press-sintering the amorphous magnetic powders. In the press-sintering, the amorphous magnetic powders are fed into a forming mold, and pressure is applied to the amorphous magnetic powders. The resulting molded body may be an anisotropic bulk magnet. A crystal grain may be formed while the press-sintering is performed.

If a method in which sintering is possible is used, the press-sintering can be performed without any specific restriction using such a method. For example, the pressing-sintering may be performed using any one method selected from the group consisting of hot press-sintering, hot isostatic press-sintering, discharge plasma sintering, and microwave sintering. The press-sintering is a step of densely solidifying the magnetic powders and may also be a step of combining the magnetic powders into a bulk.

The press-sintering may be performed using, for example, a hot-press apparatus. Specifically, the press-sintering may be performed using an apparatus in which powders are fed into a mold inside a chamber, then the mold is heated to a specific temperature in a vacuum or inert gas atmosphere, and then the powders are sintered by applying pressure thereto.

The press-sintering may be performed at a temperature of 500° C. to 900° C., 600° C. to 800° C., 500° C. to 700° C. or 600° C. to 700° C. In a case where the press-sintering is performed within this temperature range, outer surfaces of the amorphous magnetic powders may be suitably melted and sintered, and a small-sized crystal grain may be formed inside each of the amorphous magnetic powders.

The press-sintering may be performed at a pressure of 50 MPa to 1000 MPa, 100 MPa to 500 MPa, 200 MPa to 500 MPa, or 100 MPa or 300 MPa. In a case where the press-sintering is performed within this pressure range, the outer surfaces of the amorphous magnetic powders may be suitably melted and sintered, and a small-sized crystal grain may be formed inside each of the amorphous magnetic powders.

The isotropic bulk magnet is manufactured, and then the anisotropic bulk magnet is manufactured by hot-deforming the isotropic bulk magnet. The crystal grains contained in the isotropic bulk magnet may be aligned through the hot-deforming process, and by making the crystal grains anisotropic, the anisotropic bulk magnet may be manufactured.

The hot-deforming may be performed at a temperature of 500° C. to 900° C., 600° C. to 800° C., 500° C. to 700° C., or 600° C. to 700° C. In a case where the hot-deforming is performed within this temperature range, the crystal grains in the isotropic bulk magnet may be efficiently aligned, and accordingly, the magnetic properties of the anisotropic bulk magnet may be improved.

The hot-deforming may be performed at a pressure of 20 MPa to 1000 MPa, 100 MPa to 500 MPa, 200 MPa to 500 MPa, or 100 MPa to 300 MPa. In a case where the hot-deforming is performed within this temperature range, the crystal grains in the isotropic bulk magnet may be efficiently aligned, and accordingly, the magnetic properties of the anisotropic bulk magnet may be improved.

According to the first embodiment of the present disclosure, the hot-deforming may be performed in such a manner that a deforming ratio expressed as following Equation 2 is 1 to 2, or 1.5 to 2.

$$\varepsilon=\ln(h_0/h) \quad \text{[Equation 2]}$$

where ε means a deforming ratio, $h_0$ is a height of an initial sample, and h is a height of the post-deforming sample.

In a case where the deforming ratio satisfies a value within the above-mentioned range, a residual magnetic flux density may be increased by making the crystal grains anisotropic. Specifically, the crystal grains inside the isotropic bulk magnet may be grown to a plate shape during the press-sintering process and the hot-deforming process. The plate shape may correspond to the shape of a plate that extends perpendicularly to a direction in which magnetization is facilitated. Because a melting point of an interface phase of a grain boundary is lower than a process temperature, the interface phase is present as a liquid phase during the process. At this point, when the sample is pressed, crystal grains inside the sample are rotated, and thus a direction in which magnetization of each crystal grain is facilitated may be aligned horizontally to a pressing direction. Consequently, the grains may be made to be anisotropic in a crystallized manner.

According to the first embodiment of the present disclosure, the hot-deforming may be performed in such a manner that a deforming speed expressed as following Equation 3 is 0.001/s to 1.0/s.

$$\acute{\varepsilon}=\varepsilon/t \quad \text{[Equation 3]}$$

where $\acute{\varepsilon}$ is a deforming speed, ε is a deforming ratio, and t is a time.

The deforming speed may vary according to a composition for each of the amorphous magnetic powders, a temperature for performing a process, and the purpose and the need of a magnet to be manufactured.

According to the first embodiment of the present disclosure, the anisotropic bulk magnet may contain a weight fraction of $ReFe_2$ phase that satisfies following Equation 1.

$$P\leq A*X-3 \quad \text{[Equation 1]}$$

where P is a weight fraction (wt %) of $ReFe_2$ phase with respect to the entire anisotropic bulk magnet, X is a fraction of the number of moles of Ce with respect to the total number of moles of Re, and A is 13 to 15. Specifically, P may denote a weight fraction (wt %) of $ReFe_2$ phase with respect to a total weight of the anisotropic bulk magnet, X may denote a fraction of the number of moles of Ce with respect to the total number of moles of Re, and X may denote a dimensionless variable that is greater than 0 and smaller than 1, 0.1 to 0.7, or 0.3 to 0.5. In addition, the A may be 13 to 15, 13 to 14, or, for example, 13.3. In a case where Equation 1 is satisfied, the anisotropic rare-earth bulk magnet according to the first embodiment of the present disclosure may contain a small amount of $ReFe_2$ phase that corresponds to an impurity and thus may have excellent magnetic properties.

According to the first embodiment of the present disclosure, the X may correspond to a value expressed as x in the above-mentioned composition formula for the amorphous magnetic powders. That is, the amorphous magnetic powders may each have, for example, a composition of $(Nd_{1-x}Ce_x)_{13.6}Fe_{bal.}B_{5.6}M_{7.2}$. In the composition formula, x may be X and may be 0.1 to 0.9, 0.1 to 0.7, 0.1 to 0.5, 0.2 to 0.4, 0.2 to 0.5, 0.2 to 0.3, or 0.3 to 0.4, bal. may mean a balance as a content that, when added to any other component as a content, is 100, M may be a non-rare-earth metal containing one or more of Ga, Co, Al, Cu, Nb, Ti, Si, Zr, Ta, V, Mo, Mn, Zn, Ni, Cr, Pb, Sn, In, Mg, Ag, and Ge, as listed above, and characters shown as a subscript may be in unit of atom %.

According to the first embodiment of the present disclosure, for example, in a case where a fraction of the number of moles of Ce with respect to the total number of moles of Nd and Ce is 0.3, the anisotropic bulk magnet may contain less than 1.8 wt %, less than 1.5 wt %, less than 1 wt %, less than 0.5 wt %, or less than 0.3 wt % of $ReFe_2$ phase. In addition, in a case where the fraction of the number of moles of Ce with respect to the total number of moles of Nd and Ce is 0.4, the anisotropic bulk magnet may contain less than 5 wt %, less than 3 wt %, less than 2 wt %, less than 1.5 wt %, or less than 1.3 wt % of $ReFe_2$ phase. In addition, in a case where the fraction of the number of moles of Ce with respect to the total number of moles of Nd and Ce is 0.5, the anisotropic bulk magnet may contain less than 5 wt %, less than 4 wt %, less than 3 wt %, less than 2.5 wt %, or less than 2 wt % of $ReFe_2$ phase.

That is, the anisotropic bulk magnet manufactured with the method according to the first embodiment of the present disclosure may not contain $ReFe_2$ phase or may contain a very small amount of $ReFe_2$ phase, if any.

$ReFe_2$ phase may contain Ce and, according to a composition for an ingot to be used, may further contain one or more elements selected from the group consisting of Nd, Sc, Y, La, Pr, Pm, Sm, Eu, Gd, Tb, Dy, Ho, Er, Tm, Yb, and Lu. In a case where the anisotropic bulk magnet contains a very small amount of $ReFe_2$ phase, the anisotropic bulk magnet is seldom influenced by $ReFe_2$ phase corresponding to a phase that reduces a magnetic property. Thus, the anisotropic bulk magnet may have magnetic properties, such as a remanent magnetization scale, that are excellent.

According to a second embodiment of the present disclosure, there is provided an anisotropic rare-earth bulk magnet, manufactured with the above-described method, in which an anisotropic rare-earth crystal grain has an average short-axis length of 20 nm to 300 nm and an average long-axis length of 100 nm to 1000 nm.

The anisotropic rare-earth bulk magnet according to the first embodiment of the present disclosure seldom contains $ReFe_2$ phase and thus may have the magnetic properties, such as the remanent magnetization scale and a maximum magnetic energy product, that are excellent.

According to the first embodiment of the present disclosure, an aspect ratio of the crystal grain may be 1 to 10, 1 to 9, 1 to 7, or 1 to 5.

The aspect ratio may mean a ratio (a long axis/a short axis) of a long axis to a short axis. The crystal grain has the shape of a plate. The short axis in the plate-shaped crystal grain may mean a length in the thickness direction, and the long axis in the plate-shaped crystal grain may mean the largest width of one surface of the crystal grain that is perpendicular to the thickness direction.

In addition, the crystal grains in the anisotropic rare-earth bulk magnet according to the second embodiment of the present disclosure may be well aligned in one direction in which the magnetization is facilitated and thus may have the magnetic properties, such as the remanent magnetization scale and the maximum magnetic energy product, that are excellent.

The anisotropic rare-earth bulk magnet according to the first embodiment of the present disclosure may have a remanent magnetization scale of 10 kG or more, 11 kG or more, 12 kG or more, 12.5 kG or more, or 12.75 kG or more.

The anisotropic rare-earth bulk magnet according to the first embodiment of the present disclosure may have a maximum magnetic energy product of 25 MGOe or more, 30 MGOe or more, 35 MGOe or more, 38 MGOe or more, or 40 MGOe or more.

MODE FOR INVENTION

Practical examples will be in detail described below to specifically describe the present disclosure. However, the practical examples according to the present disclosure may be modified in various forms, and the scope of the present disclosure is not constructed as being limited to the practical examples described below. The practical examples in the present specification are provided to enable a person of ordinary skill in the art to get a full understanding of the present disclosure.

Manufacturing Example 1

An ingot having a composition of $(Nd_{0.7}Ce_{0.3})_{13.6}Fe_{bal.}Ga_{0.6}Co_{6.6}B_{5.6}$ was manufactured by melting Fe, Nd, B, Ce, Co, and Ga metals using an arc-melting method, and then the ribbon was manufactured by melt-spinning the ingot at a wheel speed of 35 m/s. Magnetic powders were manufactured by pulverizing the manufactured ribbon into particles, each with an average diameter of 200 μm.

Manufacturing Example 2

Magnetic powders were manufactured with the same method as in Manufacturing Example 1, except that an ingot having a composition of $(Nd_{0.6}Ce_{0.4})_{13.6}Fe_{bal.}Ga_{0.6}Co_{6.6}B_{5.6}$ is used in Manufacturing Example 1.

Manufacturing Example 3

Magnetic powders were manufactured with the same method as in Manufacturing Example 1, except that an ingot having a composition of $(Nd_{0.5}Ce_{0.5})_{13.6}Fe_{bal.}Ga_{0.6}Co_{6.6}B_{5.6}$ is used in Manufacturing Example 1.

Manufacturing Example 4

Magnetic powders were manufactured with the same method as in Manufacturing Example 1, except that a ribbon was manufactured by melt-spinning the ingot at a wheel speed of 28 m/s in Manufacturing Example 1.

Manufacturing Example 5

Magnetic powders were manufactured with the same method as in Manufacturing Example 2, except that a ribbon was manufactured by melt-spinning the ingot at a wheel speed of 28 m/s in Manufacturing Example 2.

Manufacturing Example 6

Magnetic powders were manufactured with the same method as in Manufacturing Example 3, except that a ribbon was manufactured by melt-spinning the ingot at a wheel speed of 28 m/s in Manufacturing Example 3.

Manufacturing Example 7

Magnetic powders were manufactured with the same method as in Manufacturing Example 1, except that an ingot having a composition of $Nd_{13.6}Fe_{bal.}Ga_{0.6}Co_{6.6}B_{5.6}$ is used in Manufacturing Example 1.

Manufacturing Example 8

Magnetic powders were manufactured with the same method as in Manufacturing Example 7, except that a ribbon was manufactured by melt-spinning the ingot at a wheel speed of 28 m/s in Manufacturing Example 7.

Experimental Example 1: Checking of Amorphous Powders

An X-Ray diffraction pattern of the magnetic powders manufactured in Manufacturing Examples 1 and 6 was analyzed using an X-Ray Diffractometer (XRD) (Model No. D/MAX-2500 manufactured by RIGAKU).

Figure 2A:
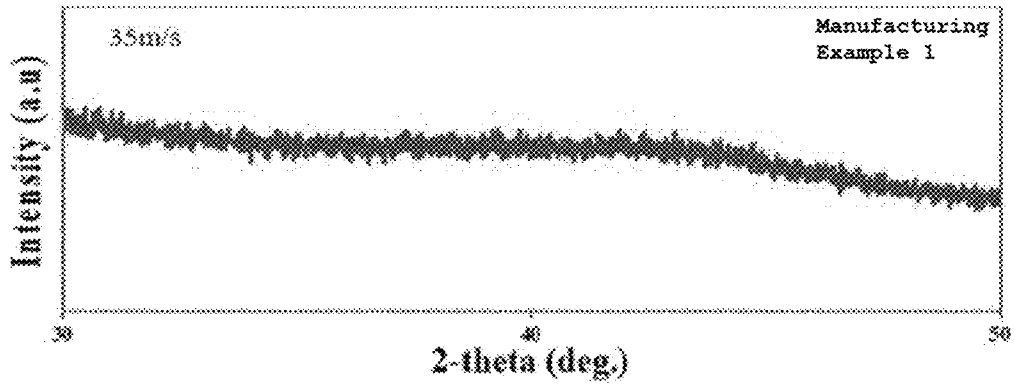
FIG. 2*a* is a graph showing an XRD pattern of magnetic powders manufactured in Manufacturing Example 1.
Figure 2B:
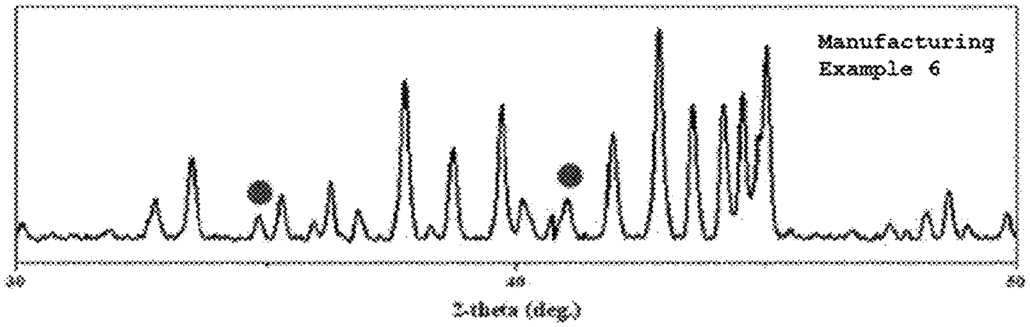
FIG. 2*b* is a graph showing an XRD pattern of magnetic powders manufactured in Manufacturing Example 6.

FIG. 2*a* is a graph showing an XRD pattern of the magnetic powders manufactured in Manufacturing Example 1, and FIG. 2*b* is a graph showing an XRD pattern of the magnetic powders manufactured in Manufacturing Example 6.

From FIGS. 2*a* and 2*b*, it can be seen that the magnetic powders manufactured in Manufacturing Example 1 were amorphous without a specific crystalline phase being formed therein and that a specific peak was not observed. It can be seen that in the magnetic powders manufactured in Manufacturing Example 6, peaks of $Re_2Fe_{12}B$ phase and $ReFe_2$ phase were observed, that the peak of $ReFe_2$ phase was observed at positions of approximately 35° and 41°, and that crystalline powders were formed. That is, it can be seen that, in a case where a wheel speed is high and thus where a cooling speed is high, the amorphous powders were manufactured and that, in a case where the wheel speed is low and thus where the cooling speed is low, the crystalline powders were manufactured. It can be seen that, when computed from FIG. 2*b*, approximately 7.0 wt % of $ReFe_2$ phase that was regarded as being high wt %, was contained in Manufacturing Example 6.

Practical Example 1

The amorphous magnetic powders manufactured in Manufacturing Example 1 were fed in a mold of a press-sintering apparatus and were pressed at a pressure of 100 MPa at a temperature of 700° C. for three minutes, and thus an isotropic bulk magnet was manufactured. The manufactured isotropic bulk magnet was hot-deformed at a deforming speed of 0.1 s-1 at a temperature of 700° C. in such a manner that the deforming ratio is 1.5, and thus an anisotropic rare-earth bulk magnet was manufactured.

Practical Example 2

An anisotropic rare-earth bulk magnet was manufactured with the same method as in Practical Example 1, except that the pressing was performed at a pressure of 200 MPa in Practical Example 1.

Practical Example 3

An anisotropic rare-earth bulk magnet was manufactured with the same method as in Practical Example 1, except that the pressing was performed at a pressure of 300 MPa in Practical Example 1.

Practical Example 4

An anisotropic rare-earth bulk magnet was manufactured with the same method as in Practical Example 1, except that the pressing was performed for 20 minutes in Practical Example 1.

Practical Example 5

An anisotropic rare-earth bulk magnet was manufactured with the same method as in Practical Example 1, except that the pressing was performed at a temperature 650° C. for 20 minutes in Practical Example 1.

Practical Example 6

An anisotropic rare-earth bulk magnet was manufactured with the same method as in Practical Example 1, except that the pressing was performed at a temperature 800° C. for 20 minutes in Practical Example 1.

Practical Example 7

An anisotropic rare-earth bulk magnet was manufactured with the same method as in Practical Example 4, except that the amorphous magnetic powders manufactured in Manufacturing Example 2 were used in Practical Example 4.

Practical Example 8

An anisotropic rare-earth bulk magnet was manufactured with the same method as in Practical Example 4, except that the amorphous magnetic powders manufactured in Manufacturing Example 3 were used in Practical Example 4.

Practical Example 9

An anisotropic rare-earth bulk magnet was manufactured with the same method as in Practical Example 1, except that the pressing was performed at a temperature 800° C. in Practical Example 1.

Comparative Example 1

An anisotropic rare-earth bulk magnet was manufactured with the same method as in Practical Example 1, except that the magnetic powders manufactured in Manufacturing Example 4 were used in Practical Example 1.

Comparative Example 2

An anisotropic rare-earth bulk magnet was manufactured with the same method as in Practical Example 4, except that the magnetic powders manufactured in Manufacturing Example 4 were used in Practical Example 4.

Comparative Example 3

An anisotropic rare-earth bulk magnet was manufactured with the same method as in Practical Example 4, except that the magnetic powders manufactured in Manufacturing Example 5 were used in Practical Example 4.

Comparative Example 4

An anisotropic rare-earth bulk magnet was manufactured with the same method as in Practical Example 4, except that the magnetic powders manufactured in Manufacturing Example 6 were used in Practical Example 4.

Reference Example 1

An anisotropic rare-earth bulk magnet was manufactured with the same method as in Practical Example 4, except that the magnetic powders manufactured in Manufacturing Example 7 were used in Practical Example 4.

Reference Example 2

An anisotropic rare-earth bulk magnet was manufactured with the same method as in Practical Example 4, except that the magnetic powders manufactured in Manufacturing Example 8 were used in Practical Example 4.

Experimental Example 2: Checking of a SEM Image

The bulk magnet that was not yet hot-deformed after being press-sintered in Practical Examples 1 and 4, and the anisotropic rare-earth bulk magnet manufactured in Practical Examples 1 and 4 to 8 and Comparative Example 1 were cut, and cut surfaces thereof were photographed at ×10000 in a backscatter electron (BSE) image mode using a scanning electron microscope (SEM) (Model No. 7001F manufactured by JEOL Ltd.).

Figure 3:
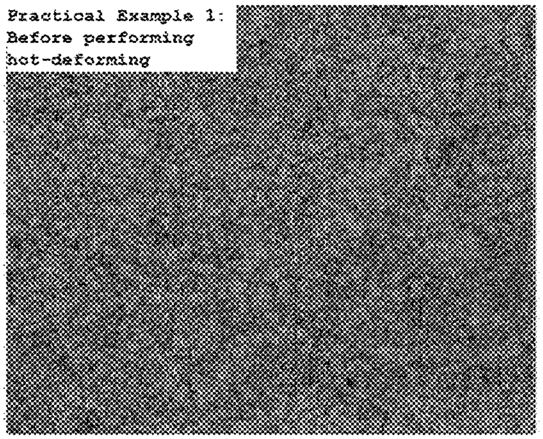
FIG. 3 is photographs showing SEM images, respectively, of cut surfaces of the bulk magnets that were not yet hot-deformed after being press-sintered in Practical Examples 1 and 4.
Figure 3:
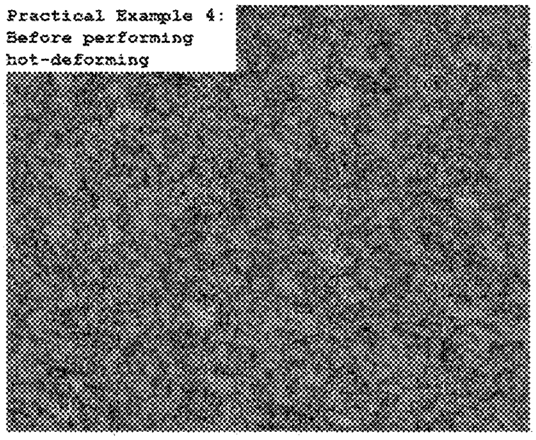

FIG. 3 is photographs showing SEM images, respectively, of the cut surfaces of the bulk magnets that were not yet hot-deformed after being press-sintered in Practical Examples 1 and 4. FIGS. 4 to 10 are photographs showing SEM images, respectively, of cut surfaces of the anisotropic rare-earth bulk magnets manufactured in Practical Example 1, Practical Example 4, Practical Example 9, Practical Example 6, Practical Example 7, Practical Example 8, and Comparative Example 1.

Figure 4:
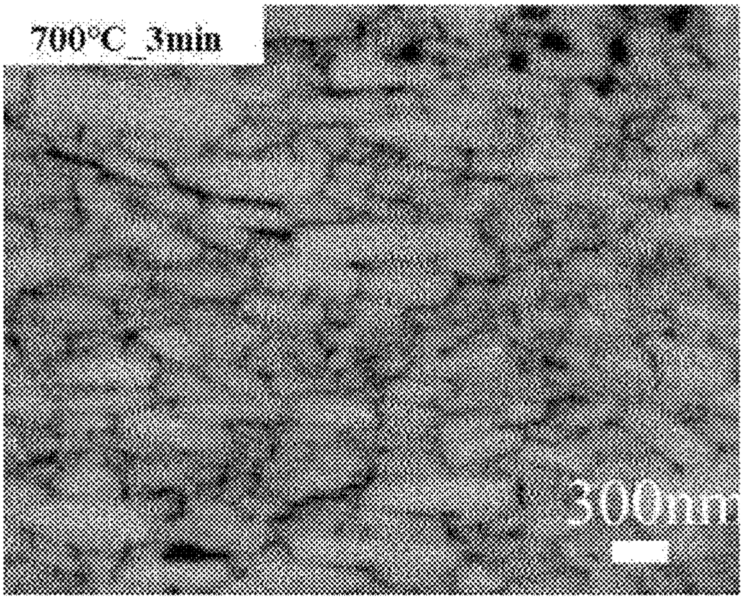
FIG. 4 is a photograph showing a SEM image of a cut surface of an anisotropic rare-earth bulk magnet manufactured in Practical Example 1.
Figure 5:
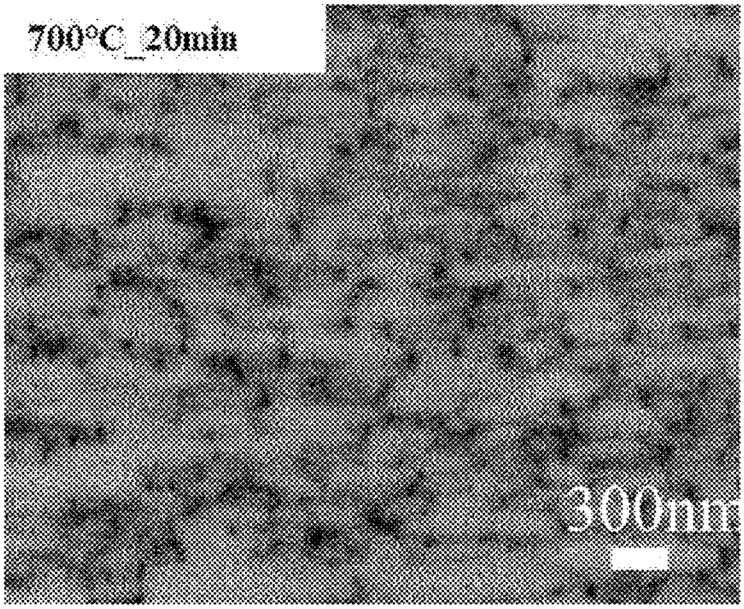
FIG. 5 is a photograph showing a SEM image of a cut surface of an anisotropic rare-earth bulk magnet manufactured in Practical Example 4.

From FIGS. 3 to 5, it can be seen that, since the anisotropic rare-earth bulk magnet was manufactured by being hot-deformed after being press-sintered for a longer time, in Practical Example 4 than in Practical Example 1, the anisotropic rare-earth bulk magnet in Practical Example 4 has finer crystal grains and a greater aspect ratio of the crystal grain than that in Practical Example 1.

Figure 6:
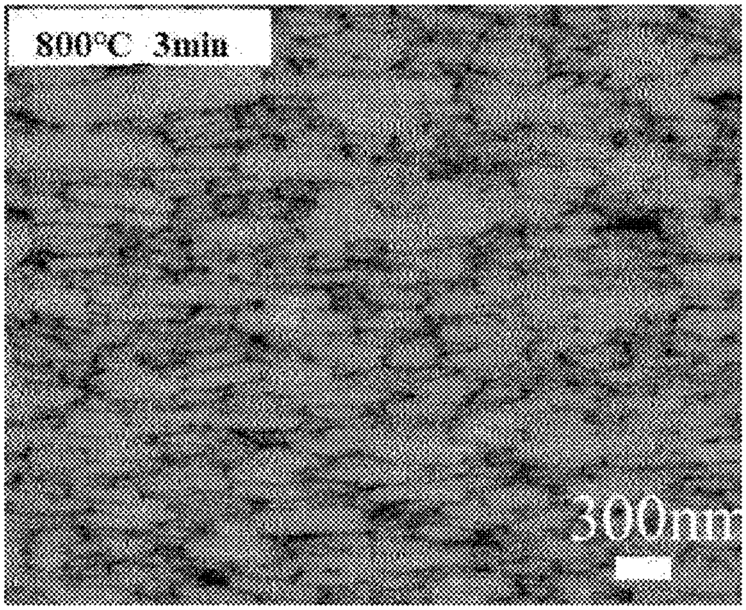
FIG. 6 is a photograph showing a SEM image of a cut surface of an anisotropic rare-earth bulk magnet manufactured in Practical Example 9.
Figure 7:
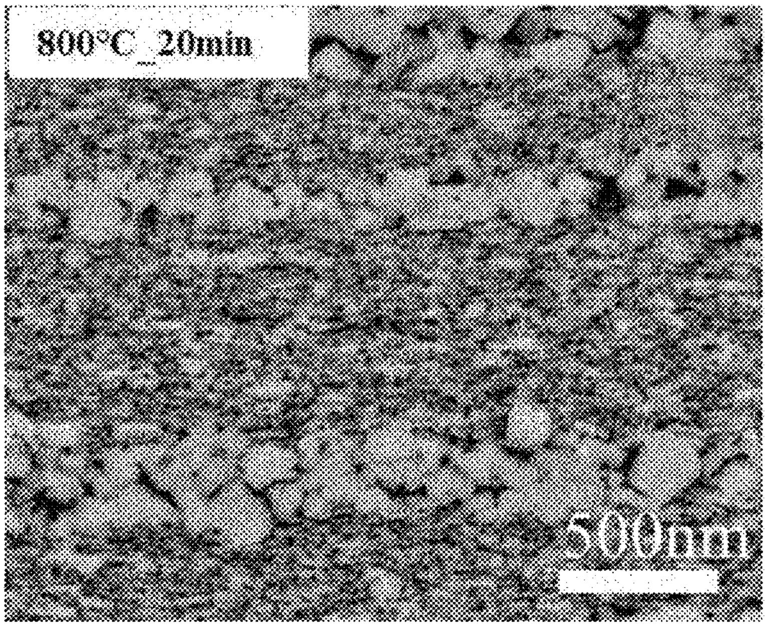
FIG. 7 is a photograph showing a SEM image of a cut surface of an anisotropic rare-earth bulk magnet manufactured in Practical Example 6.
Figure 8:
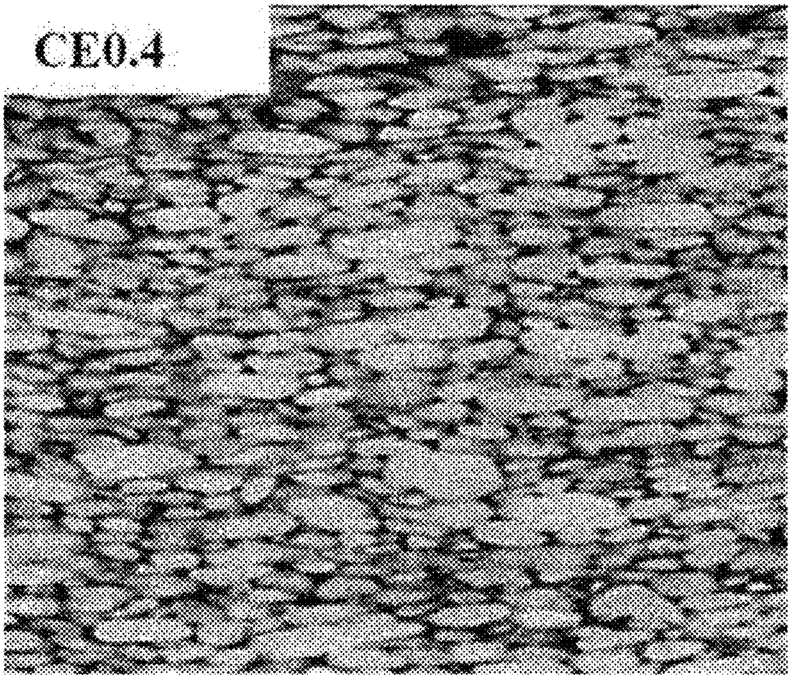
FIG. 8 is a photograph showing a SEM image of a cut surface of an anisotropic rare-earth bulk magnet manufactured in Practical Example 7.
Figure 9:
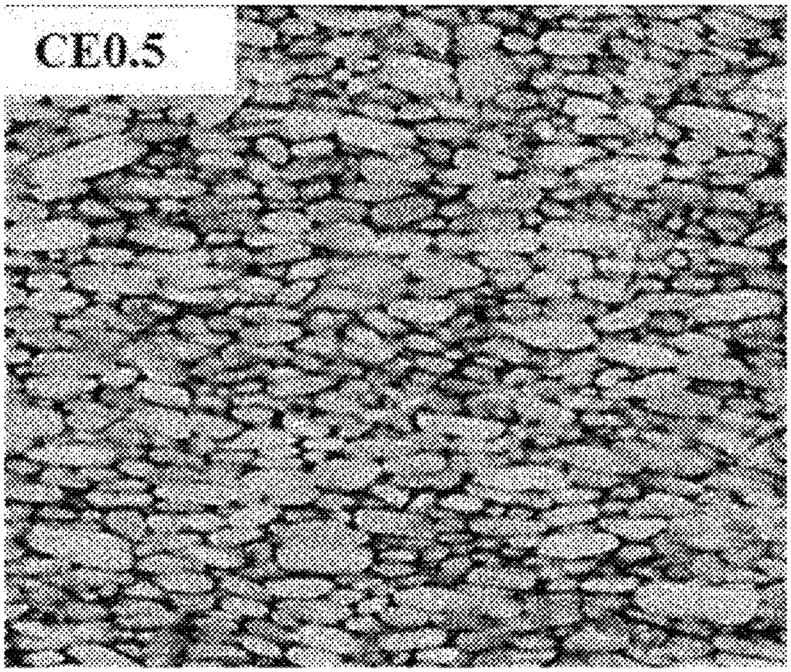
FIG. 9 is a photograph showing a SEM image of a cut surface of an anisotropic rare-earth bulk magnet manufactured in Practical Example 8.
Figure 10:
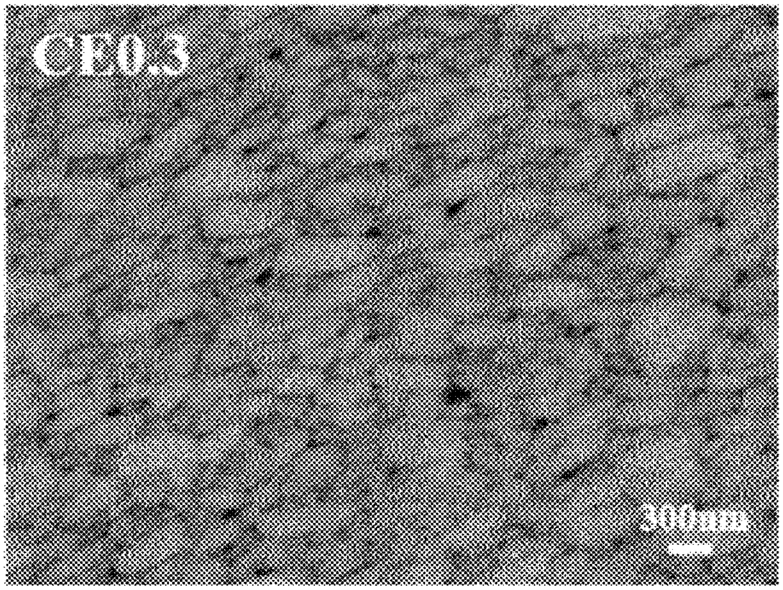
FIG. 10 is a photograph showing a SEM image of a cut surface of an anisotropic rare-earth bulk magnet manufactured in Comparative Example 1.

From FIGS. 6 and 7, it can be seen that, in a case where the press-sintering was performed at a higher temperature than in Practical Example 1 (Practical Example 9), the aspect of the crystal grain is greater. However, it can also be seen that, in a case where the press-sintering was performed at a higher temperature for a longer time than in Practical Example 1 (Practical Example 6), a phenomenon occurs in which the crystal grain is abnormally grown on a specific region that corresponds to an interface of the pre-press-sintering powder.

The more increased a Ce content, the more decreased a fraction of Re-rich phase and the more generated $ReFe_2$ phase. Because of this, it was expected that the crystal grains would be difficult to align. However, from FIGS. 8 and 9, it can be seen that the anisotropic rare-earth bulk magnets in Practical Examples 7 and 8 were made to be properly anisotropic From FIG. 10, it can be seen that the anisotropic rare-earth bulk magnet manufactured using the crystalline powders has a slightly inferior crystallographic orientation with respect to the pressing direction (a vertical direction). Particularly, it can be seen that, when compared with the image of the anisotropic rare-earth bulk magnet in FIG. 4 that was manufactured using the amorphous powders, the crystal grains of the magnet are well aligned in one direction when the amorphous powders were used than when the crystalline powders were used and that the aspect ratio of the crystal grain is greater.

Experimental Example 3: Checking of Whether or not $ReF_2$ Phase of the Anisotropic Rear-Earth Bulk Magnet was Formed X-Ray diffraction patterns of the anisotropic rare-earth bulk magnets manufactured in Practical Example 1 and Comparative Example 1 were analyzed using the X-Ray diffractometer (XRD) (Model No. D/MAX-2500 manufactured by RIGAKU).

Figure 11A:
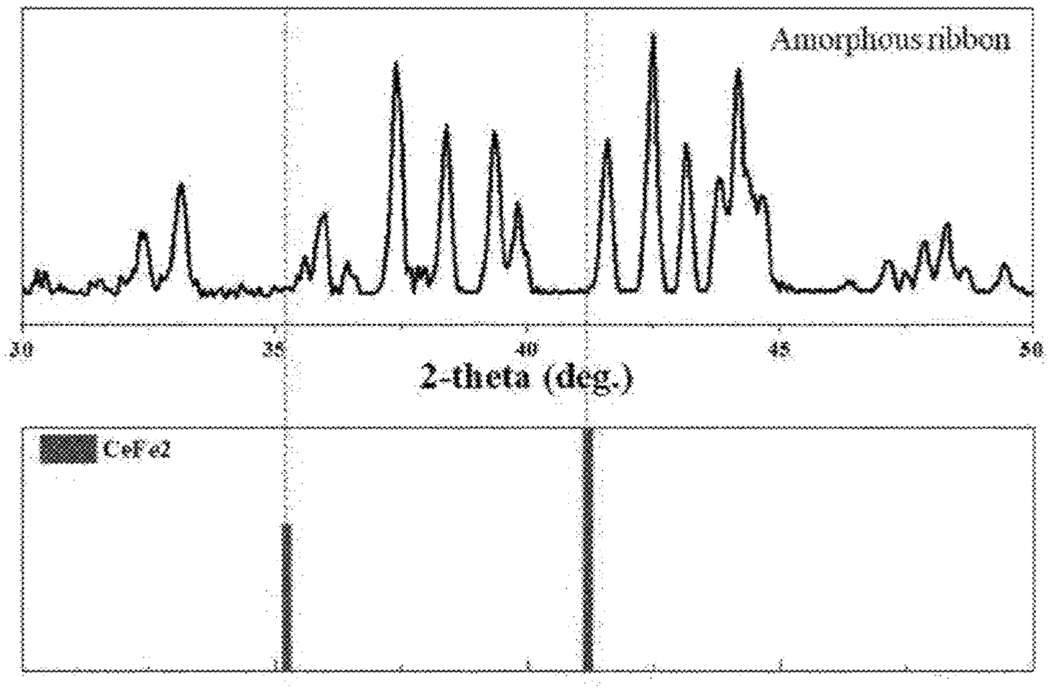
FIGS. 11*a* and 11*b* are graphs showing XRD patterns, respectively, of the anisotropic rare-earth bulk magnet manufactured in Practical Example 1 and an anisotropic rare-earth bulk magnet manufactured in Comparative Example 1.
Figure 11B:
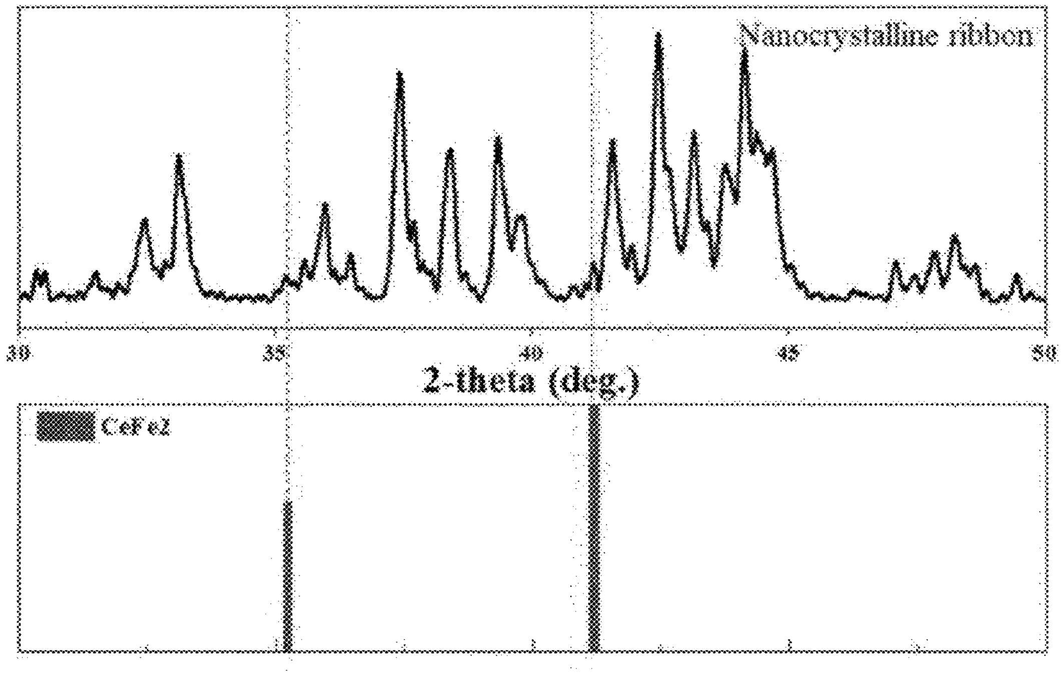

FIGS. 11*a* and 11*b* are photographs showing the XRD patterns, respectively, of the anisotropic rare-earth bulk magnets manufactured in Practical Example 1 and Comparative Example 1.

From FIGS. 11*a* and 11*b*, it can be seen that the peak of $CeFe_2$ is not observed in the XRD pattern of the anisotropic rare-earth bulk magnet in Practical Example 1 that was manufactured using the amorphous magnetic powders, but that the peak of $CeFe_2$ is observed in the XRD pattern of the anisotropic rare-earth bulk magnet in Comparative Example 1 that was manufactured using the crystalline magnetic powders. That is, it can be seen that, in a case where the amorphous magnetic powders were used, $ReFe_2$ phase that was formed in a case where the crystalline magnetic powders were used was not formed Experimental Example 4: Measurement and Evaluation of Parameters of Magnetic Properties The anisotropic rare-earth bulk magnets manufactured in Practical Examples 1 to 8 and Comparative Examples 1 to 4 were processed to sizes of 3 cm×3 cm×1 cm, and then were magnetized using a 7 T pulsed magnetic field. Using a vibrating sample magnetometer (VSM) (manufacture by LakeShore), the magnetized sample was swept by applying a magnetic field in a range of −1.8 T to 1.8 T thereto, and the magnetic properties thereof, such as the remanent magnetization scale and the maximum magnetic energy product, were measured.

Figure 12A:
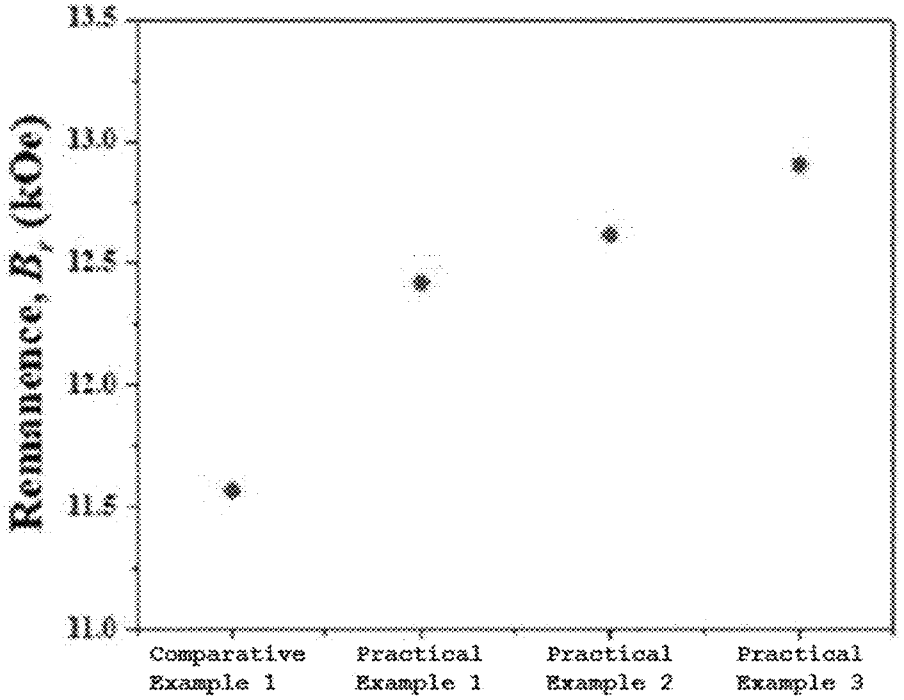
FIGS. 12*a* and 12*b* are graphs showing a remanent magnetization scale and a maximum magnetic energy product of each of the anisotropic rare-earth bulk magnets manufactured in Practical Examples 1 to 3 and Comparative Example 1.
Figure 12B:
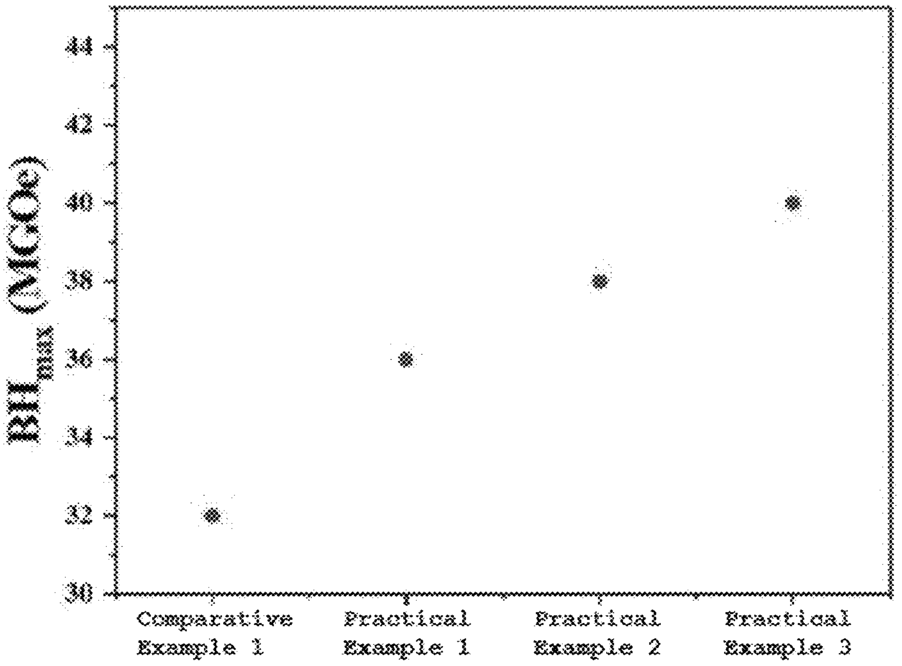

FIGS. 12*a* and 12*b* are graphs showing the remanent magnetization scale and the maximum magnetic energy product, respectively, of each of the anisotropic rare-earth bulk magnets manufactured in Practical Examples 1 to 3 and Comparative Example 1.

Figure 13A:
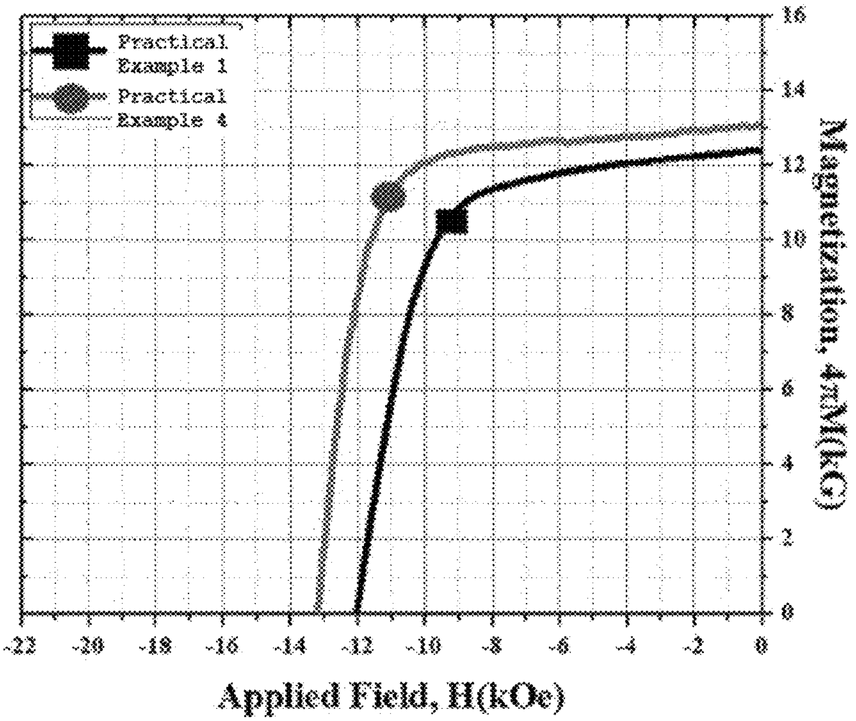
FIG. 13*a* is a graph that is demagnetizing curves for the anisotropic rare-earth bulk magnets manufactured in Practical Examples 1 and 4.
Figure 13B:
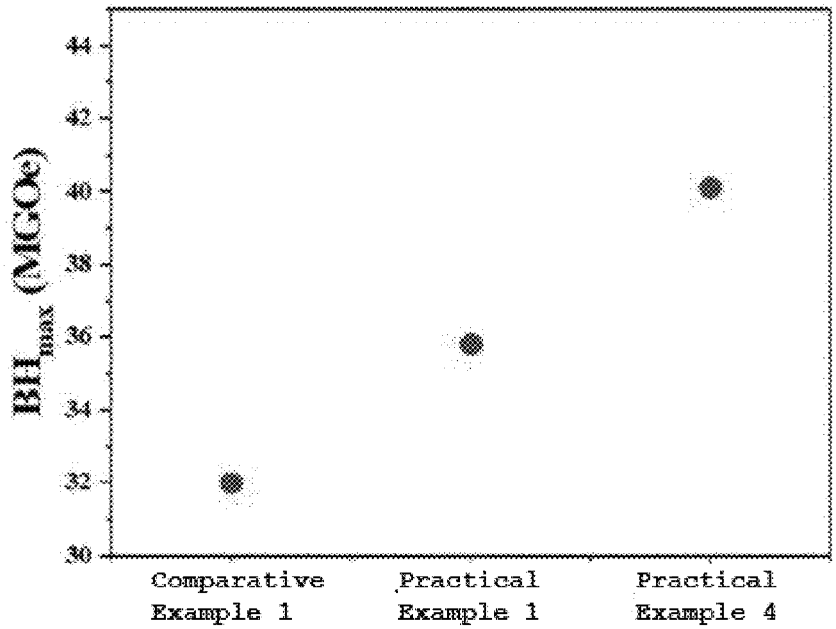
FIG. 13*b* is a graph showing a maximum magnetic energy product of each of the anisotropic rare-earth bulk magnets manufactured in Practical Example 1 and 4 and Comparative Example 1.

FIG. 13*a* is a graph that is demagnetizing curves for the anisotropic rare-earth bulk magnets manufactured in Practical Examples 1 and 4. FIG. 13*b* is a graph showing the maximum magnetic energy product of each of the anisotropic rare-earth bulk magnets manufactured in Practical Example 1 and 4 and Comparative Example 1.

Figure 14:
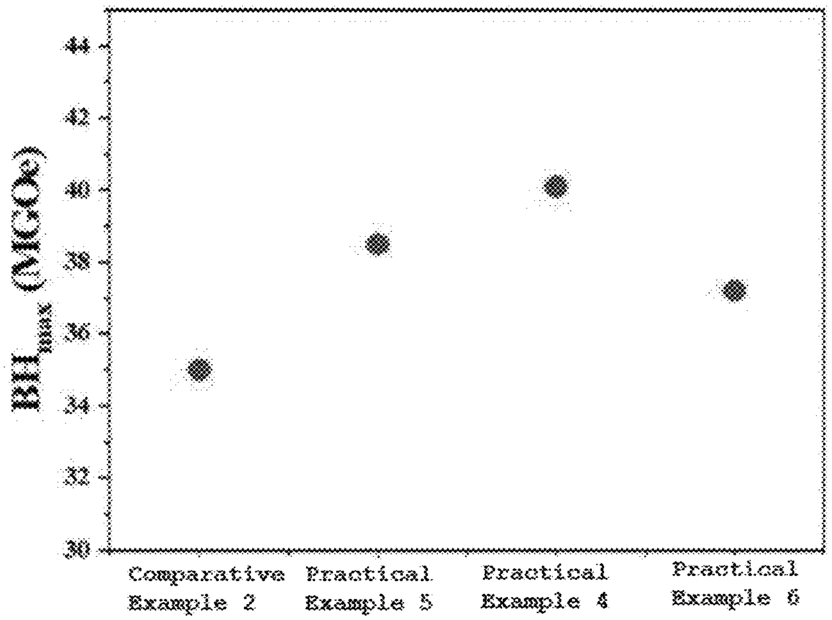
FIG. 14 is a graph showing a maximum magnetic energy product of each of the anisotropic rare-earth bulk magnets manufactured in Practical Examples 4 to 6 and Comparative Example 2.

FIG. 14 is a graph showing the maximum magnetic energy product of each of the anisotropic rare-earth bulk magnets manufactured in Practical Examples 4 to 6 and Comparative Example 2.

Figure 15:
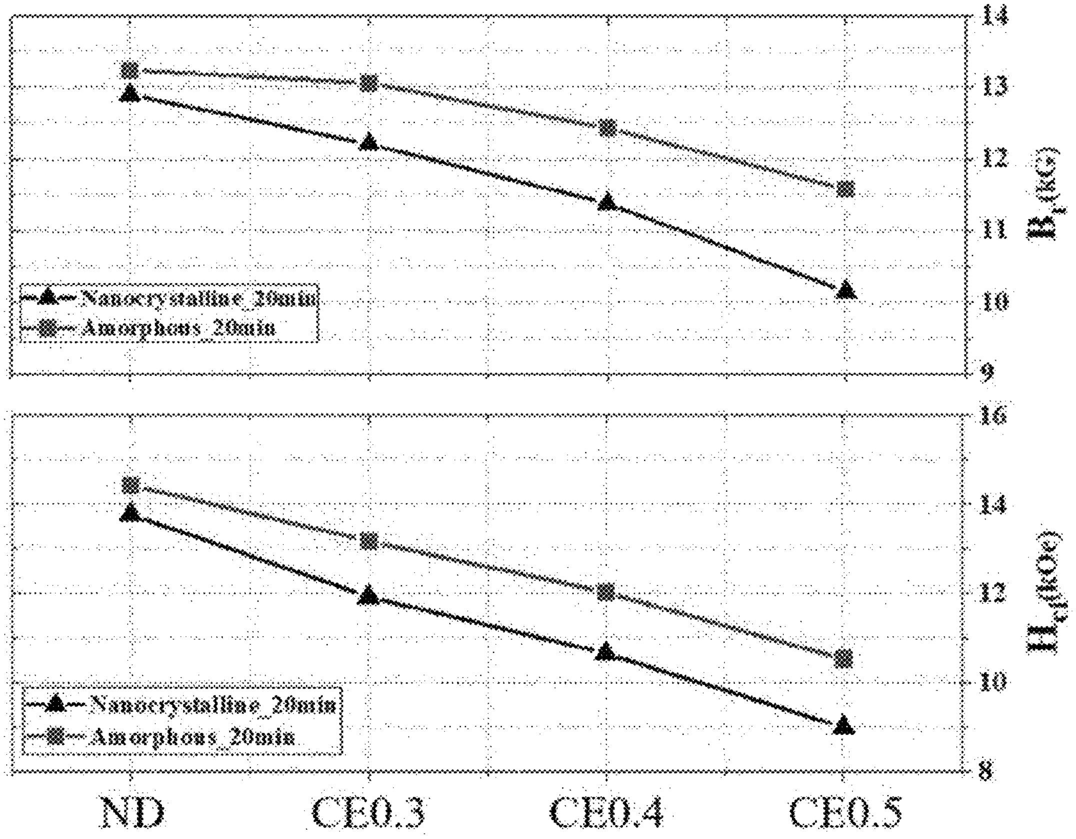
FIG. 15 is graphs showing a remanent magnetization scale and a coercive force of each of the anisotropic rare-earth bulk magnets manufactured in Practical Examples 4, 7, and 8, Comparative Examples 2, 3, and 4, and Reference Examples 1 and 2.

FIG. 15 is graphs showing the remanent magnetization scale and a coercive force of each of the anisotropic rare-earth bulk magnets manufactured in Practical Examples 4, 7, and 8, Comparative Examples 2, 3, and 4, and Reference Examples 1 and 2.

From FIGS. 12*a* and 12*b*, it can be seen that the anisotropic rare-earth bulk magnets manufactured in Practical Examples 1 to 3 each have a larger remanent magnetization scale and a greater maximum magnetic energy product than the anisotropic rare-earth bulk magnet manufactured in Comparative Example 1 and thus have excellent magnetic properties.

Particularly, it can be seen that the anisotropic rare-earth bulk magnet can be produced that has the remanent magnetization scale and maximum magnetic energy product that become larger and greater, respectively, as a pressure becomes higher in the pressing process. Moreover, it can be seen that the anisotropic rare-earth bulk magnet manufactured in Practical Example 3 in which the highest pressure of 300 MPa was applied in the pressing process has the largest remanent magnetization scale and the greatest maximum magnetic energy product.

From FIGS. 13*a*, 13*b*, and 14, it can be seen that in a case where the anisotropic rare-earth bulk magnet was manufactured by being press-sintered for a longer time than in Practical Example 1 (Practical Example 4), the coercive force and the remanent magnetization scale are both increased. In a case where the anisotropic rare-earth bulk magnet was manufactured by performing the press-sintering a higher temperature for a longer time than in Practical Example 1 (Practical Example 6), the maximum magnetic energy product is rather partially decreased. Therefore, it can be seen that the anisotropic rare-earth bulk magnet manufactured in Practical Example 4 has the most excellent magnetic properties.

From FIG. 15, it can be seen that, in a case where the compositions were the same and where the amorphous powders were used, the remanent magnetization scale and the coercive force are increased and thus the magnetic properties are excellent. Particularly, it can be seen that the more increased the Ce content, the more the magnetic properties are excellent in the case of the amorphous powders. It can be thought that the reason for this is because the use of the amorphous powders effectively suppresses an increase in the formation of $CeFe_2$ phase due to an increase in the Ce content. It can be seen that, in a case where Ce was not contained, a difference in effect between the use of amorphous powders and the use of the crystalline powders is not significant. It can be thought that there is no significant different in effect therebetween because the absence of Ce does not bring about the effect of suppressing the increase in the formation of $CeFe_2$ phase that is due to the use of the amorphous powders.

Experimental Example 5: Checking of a Generation Fraction of $ReFe_2$ Phase

The powders in Manufacturing Examples 4 to 6 and X-ray diffraction patterns of the anisotropic rare-earth bulk magnets manufactured in Practical Examples 4, 7, and 8, and Comparative Examples 2 to 4 were analyzed using the X-Ray diffractometer (XRD) (Model No. D/MAX-2500 manufactured by RIGAKU). A generation fraction of $ReFe_2$ Phase was derived on the basis of a result of the analysis using a Rietveld analysis method. Derived generation fractions of $ReFe_2$ are listed in following Table 1.

Figure 16:
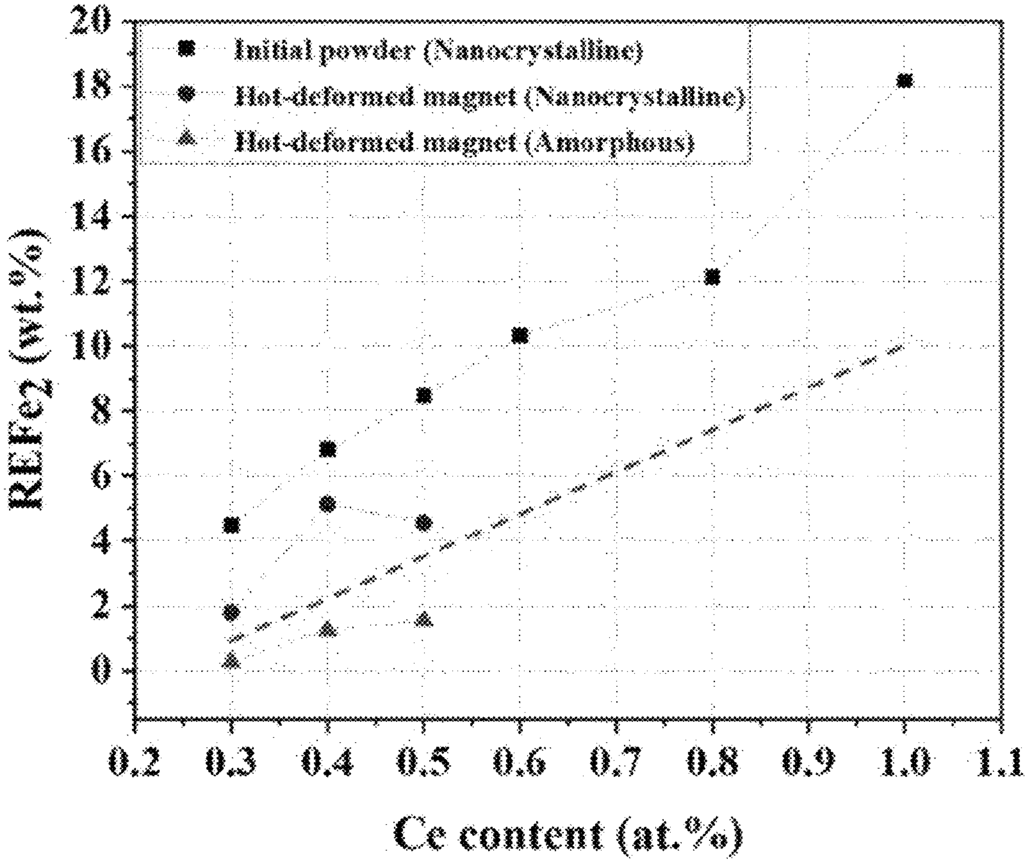
FIG. 16 is a graph showing powders in Manufacturing Examples 4 to 6 and a weight fraction of $ReFe_2$ phase that varies with a Ce content of each of the anisotropic rare-earth bulk magnets manufactured in Practical Examples 4, 7, and 8 and Comparative Example 2 to 4.

In addition, FIG. 16 is a graph showing the powders in Manufacturing Examples 4 to 6 (indicated by a rectangle) and a weight fraction of $ReFe_2$ phase that varies with a Ce content of each of the anisotropic rare-earth bulk magnets manufactured in Practical Examples 4, 7, and 8 (indicated by a triangle) and Comparative Examples 2 to 4 (indicated by a circle).

TABLE 1

| Category | Generation Fraction (wt %) of $ReFe_2$ Phase | Category | Generation Fraction (wt %) of $ReFe_2$ Phase | Category | Generation Fraction (wt %) of $ReFe_2$ Phase |
|---|---|---|---|---|---|
| Manufacturing Example 4 | 4.49 (±0.83) | Practical Example 4 | 0.27 (±0.01) | Comparative Example 2 | 1.79 (±0.03) |
| Manufacturing Example 5 | 6.82 (±0.12) | Practical Example 7 | 1.25 (±0.25) | Comparative Example 3 | 5.14 (±0.72) |
| Manufacturing Example 6 | 8.46 (±0.78) | Practical Example 8 | 1.55 (±0.16) | Comparative Example 4 | 4.56 (±0.68) |

From Table 1 and FIG. 16, it can be seen that, because an amount of $ReFe_2$ phase generated is very small although Ce is replaced with 30 to 50 at % of Nd, the magnetic properties are excellent.

Specifically, from Table 1 and FIG. 16, it can be seen that the crystalline powders in Manufacturing Examples 4 to 6 contain a very large amount of $ReFe_2$ phase.

It can be seen that, in Practical Example 4 where the amorphous powders containing a 0.3 fraction of Ce with respect to the total number of moles of Nd and Ce were used, the generation fraction of $ReFe_2$ phase is approximately 0.27 wt %, which satisfies Equation 1, but that, in Comparative Example 2 where the powders in Manufacturing Example 4 were used, the generation fraction of $ReFe_2$ phase is approximately 1.79 wt %, which does not satisfy Equation 1. Moreover, it can be seen that, in Practical Example 7 where the amorphous powders containing a 0.4 fraction of Ce with respect to the total number of moles of Nd and Ce were used, the generation fraction of $ReFe_2$ phase is approximately 1.25 wt %, which satisfies Equation 1, but that, in Comparative Example 3 where the powders in Manufacturing Example 5 were used, the generation fraction of $ReFe_2$ phase is approximately 5.14 wt %, which does not satisfy Equation 1. Moreover, it can be seen that, in Practical Example 8 where the amorphous powders containing a 0.5 fraction of Ce with respect to the total number of moles of Nd and Ce were used, the generation fraction of $ReFe_2$ phase is approximately 1.55 wt %, which satisfies Equation 1, but that, in Comparative Example 4 where the powders in Manufacturing Example 6 were used, the generation fraction of $ReFe_2$ phase is approximately 4.56 wt %, which also does not satisfy Equation 1.

In FIGS. 16, Y=A*X−3 (Y: a weight fraction of $ReFe_2$ phase, and X: a fraction of Ce with respect to the total number of moles of Nd and Ce) in a case where A is 13.3 is graphed. From FIG. 16, it can be seen that $ReFe_2$ phase in Practical Examples 4, 7, and 8 is positioned below a dotted line, which satisfied Equation 1 and that $ReFe_2$ phase in Comparative Examples 2 to 4 is positioned above the dotted line, which does not satisfy Equation 1.

In addition, from FIGS. 14 and 15, it can be seen that the anisotropic rare-earth bulk magnet has more excellent magnetic properties in Practical Examples 4, 7, and 8 than in Comparative Examples 2 to 4.

A limited number of embodiments of the present disclosure are described above, but the present disclosure is not limited thereto. Of course, it would be apparent to a person of ordinary skill in the art to which the present disclosure pertains that various modifications and alterations may be possibly made to the embodiments within the scope of the technical idea of the present disclosure, the scope of the following claims, and a scope equivalent thereto.

The invention claimed is:

1. A method of manufacturing an anisotropic rare-earth bulk magnet, the method comprising steps of:

preparing amorphous magnetic powders, each containing Re—Fe—B;

manufacturing an isotropic bulk magnet by press-sintering the amorphous magnetic powders; and manufacturing an anisotropic bulk magnet by hot-deforming the isotropic bulk magnet, wherein the Re contains Nd and Ce, and the anisotropic bulk magnet contains a weight fraction of $ReFe_2$ phase that satisfies Equation 1:

$$P \le A*X-3$$

where, P is a weight fraction (wt %) of the $ReFe_2$ phase with respect to the entire anisotropic bulk magnet, X is a fraction of the number of moles of Ce with respect to the total number of moles of the Re, and A is 13 to 15.

2. The method of claim 1, wherein the step of preparing the amorphous magnetic powders comprises steps of:

preparing an ingot containing Re—Fe—B;

manufacturing a ribbon by melt-spinning the ingot; and manufacturing powders by pulverizing the ribbon.

3. The method of claim 1, wherein the Re contains Nd and Ce and further contains one or more elements selected from the group consisting of Sc, Y, La, Pr, Pm, Sm, Eu, Gd, Tb, Dy, Ho, Er, Tm, Yb, and Lu.

4. The method of claim 1, wherein the amorphous magnetic powders has a composition of $Nd_aR_bFe_{100-a-b-c-d}M_cB_d$, where R contains one or more of Sc, Y, La, Ce, Pr, Pm, Sm, Eu, Gd, Tb, Dy, Ho, Er, Tm, Yb, and Lu, M contains one or more of Ga, Co, Al, Cu, Nb, Ti, Si, Zr, Ta, V, Mo, Mn, Zn, Ni, Cr, Pb, Sn, In, Mg, Ag, and Ge, a is equal to or greater than 0 and equal to or smaller than 20, b is equal to or greater than 0 and equal to or smaller than 20, c is equal to or greater than 0 and equal to or smaller than 15, d is equal to or greater than 0 and equal to or smaller than 15, and a, b, c, and d are in unit of atom %.

5. The method of claim 1, wherein the press-sintering is performed at a temperature of 500° C. to 900° C.

6. The method of claim 1, wherein the press-sintering is performed at a pressure of 50 MPa to 1000 MPa.

7. The method of claim 1, wherein the hot-deforming is performed at a temperature of 500° C. to 900° C.

8. The method of claim 1, wherein the hot-deforming is performed at a pressure of 20 MPa to 1000 MPa.

9. The method of claim 1, wherein the hot-deforming is performed in such a manner that a deforming ratio expressed as Equation 2 is 1 to 2, $$\varepsilon=\ln(h_0/h) \quad \text{Equation 2 being:}$$

where $\varepsilon$ means a deforming ratio, $h_0$ is a height of an initial sample, and h is a height of the post-deforming sample.

10. The method of claim 1, wherein the hot-deforming is performed in such a manner that a deforming speed expressed as Equation 3 is 0.001/s to 1.0/s, $$\acute{\varepsilon}=\varepsilon/t \quad \text{Equation 3 being:}$$

where $\acute{\varepsilon}$ is a deforming speed, $\varepsilon$ is a deforming ratio, and t is a time.

11. An anisotropic rare-earth bulk magnet manufactured with the method of claim 1, wherein a crystal grain has an average short-axis length of 20 nm to 300 nm and an average long-axis length of 100 nm to 1000 nm.

12. The anisotropic rare-earth bulk magnet of claim 11, wherein an aspect ratio of the crystal grain is 1 to 10.

13. The anisotropic rare-earth bulk magnet of claim 11, wherein a remanent magnetization scale is 10 kG or more.

14. The anisotropic rare-earth bulk magnet of claim 11, wherein a maximum magnetic energy product is 25 MGOe or more.

* * * * *